United States Patent [19]
Horiuchi et al.

[11] Patent Number: 5,463,461
[45] Date of Patent: Oct. 31, 1995

[54] COHERENT OPTICAL RECEIVER HAVING OPTICALLY AMPLIFIED LOCAL OSCILLATOR SIGNAL

[75] Inventors: Yukio Horiuchi, Niiza; Shiro Ryu, Tokyo, both of Japan

[73] Assignee: Kokusai Denshin Denwa Company, Ltd., Tokyo, Japan

[21] Appl. No.: 369,992

[22] Filed: Jan. 9, 1995

Related U.S. Application Data

[63] Continuation of Ser. No. 844,039, Mar. 2, 1992, abandoned.

[30] Foreign Application Priority Data

Mar. 6, 1991 [JP] Japan ..................... 3-040283

[51] Int. Cl.⁶ ..................... G01B 9/02
[52] U.S. Cl. ..................... 356/349; 359/191
[58] Field of Search ..................... 356/349, 141, 356/345, 191, 192

[56] References Cited

U.S. PATENT DOCUMENTS

| | | | |
|---|---|---|---|
| 4,596,052 | 6/1986 | Wright et al. | 359/191 |
| 4,718,121 | 1/1988 | Epworth | 359/190 |
| 5,035,506 | 7/1991 | Ouhayoun | 356/349 |
| 5,170,275 | 12/1992 | Large | 359/192 |

OTHER PUBLICATIONS

"The Use of an Optical Amplifier in a Coherent Receiver" by Shiro RYU et al., Institute of Electronics Information and Communication Engineers, pp. 19–24, May 24, 1991.

*Electronics Letters*, Apr. 10, 1986, vol. 22, No. 8, pp. 413–414, "Balanced Dual–Detector Receiver for Optical Heterodyne Communication at Gbit/s Rates".

*Optics Letters*, Aug., 9183, vol. 8, No. 8, pp. 419–421, "Local–Oscillator Excess–Noise Suppression for Homodyne and Heterodyne Detection".

*Primary Examiner*—Samuel A. Turner
*Attorney, Agent, or Firm*—Jordan and Hamburg

[57] ABSTRACT

The coherent optical receiver is characterized in that it comprises a local oscillator light, source, for amplifying a local oscillator light a light combining/dividing unit, a dual balanced receiver which comprises two optical detectors, and an electrical amplifier. Therefore, the coherent optical receiver has the characteristic that the length of the non-repeating section of an optical communication system including the device and employing heterodyne detection can be increased, or the dynamic range of an optical measuring system including this receiver and employing heterodyne detection can be widened.

14 Claims, 6 Drawing Sheets

COHERENT OPTICAL RECEIVER HAVING OPTICALLY AMPLIFIED LOCAL OSCILLATOR SIGNAL

This application is a continuation, of application Ser. No. 07/844,039 filed Mar. 2, 1992 now abandoned.

BACKGROUND OF THE INVENTION

The present invention relates to a coherent optical receiver which employs optical heterodyne detection and is for optical communication or optical measurement.

Figure 5:
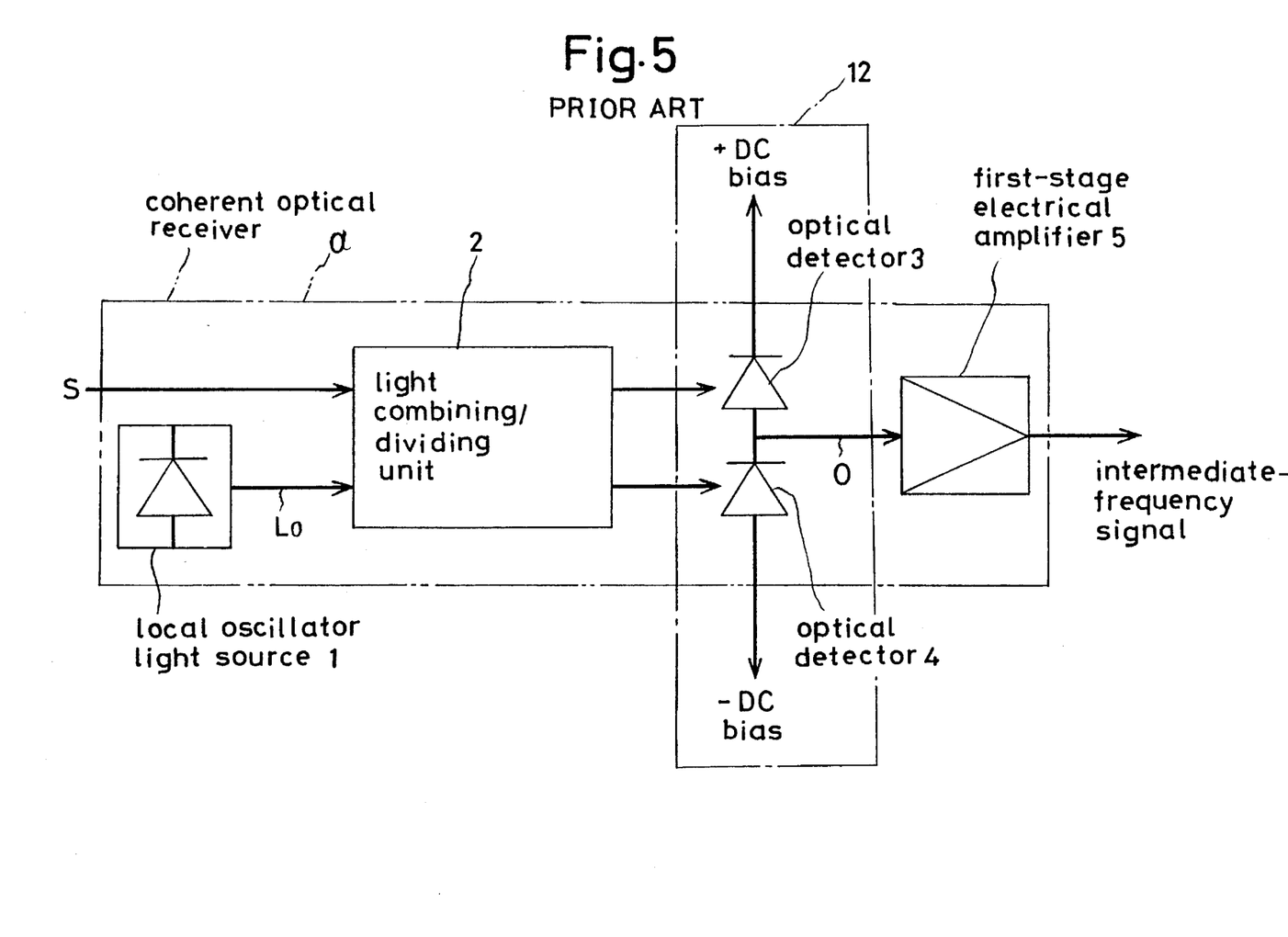
FIG. 5 is a block diagram of a conventional coherent optical receiver.

FIG. 5 shows a conventional coherent optical receiver α comprising a local oscillator light source 1, a light combining/dividing unit 2, optical detectors 3 and 4, and a first-stage electrical amplifier 5. The local oscillator light source 1 is a semiconductor laser-diode or the like, and generates a local oscillator light Lo. The light combining/dividing unit 2 is a beam splitter, an optical fiber coupler or the like, and operates so that a signal light S which is weak and transmitted through an optical fiber or the like and the local oscillator light Lo are combined and divided at a branching ratio of 50:50. The optical detectors 3 and 4 which make a dual balanced receiver 12 are for performing heterodyne detection to make beat signals from the signal light S and the local oscillator light Lo. The electrical amplifier 5 amplifies an output signal O resulting from the synthesis of the beat signals. The weak signal light S and the local oscillator light Lo are combined and divided by the light combining/dividing unit 2, the outputs from which are received by the optical detectors 3 and 4 so that the outputs undergo the heterodyne detection due to the squaring properties of the receivers to generate the beat signals which are electrical signals. The frequency of each of the beat signal is equal to the difference between those of the signal light and the local oscillator light. At the heterodyne detection, the signal light S is changed into an intermediate frequency band. The signal power to noise power ratio (SNR) in the band is generally represented by an equation as follows:

$$\frac{S}{N} = \frac{2R_o^2 PSPLo}{2eR_oPLoB + 2eR_oPSB + 2eIdB + \frac{4FKT}{R} B}$$

Ro: Photoelectric conversion coefficient $$\left( \frac{\eta e}{h\nu} \right)$$

η: Quantum efficiency of optical detector
e: Charge of electron
h: Planck's constant
v: Frequency of light
PS: Power of signal light to optical detector
PLo: Power of local oscillator light to optical detector
Id: Dark current in optical detector
F: Noise factor of electrical amplifier
K: Boltsmann's constant
T: Absolute temperature
S: Intermediate-frequency bandwidth
R: Load resistance of optical detector It is understood that the signal power S shown by the numerator of the equation is proportional to the product of the power PS of the signal light and the power PLo of the local oscillator light. The noise power N shown by the denominator of the equation is the sum of the shot noise due to the local oscillator light Lo, that due to the signal light S, that due to the dark current in the optical detector and the circuit noise of the electric amplifier, which are denoted by the first, second, third and fourth terms of the denominator. Since the signal light S is weak and the dark currents in the optical detectors 3 and 4 are very small, the shot noise due to the signal light S and those due to the dark currents are negligible.

Figure 6:
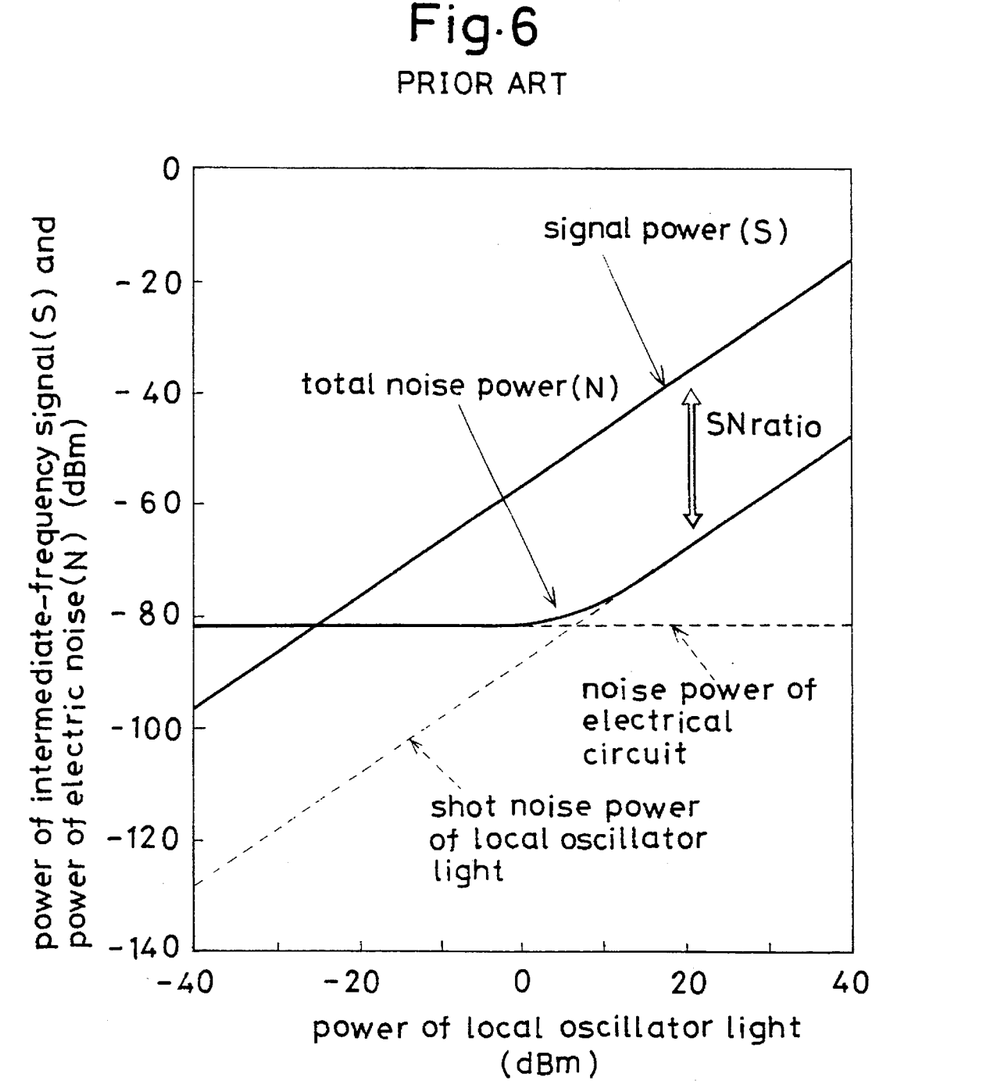
FIG. 6 is a graph showing the correlation between the power of a local oscillator light and the ratio of signal power to noise power.

FIG. 6 is a graph having an ordinate axis for the signal power S and the noise power N, and an abscissa axis for the power PLo of the local oscillator light Lo, and showing the relationship between the local oscillator light power and the optical receiver sensitivity of the optical receiver α in the case where the load resistance thereof is 50Ω for high-speed transmission and the equation is substituted with general numerical values. It is understood from FIG. 6 that the SNR is restricted by the circuit noise of the electric amplifier when the local oscillator light power PLo is low (about 10 dBm or less), but the ratio is restricted by the shot noise due to the local oscillator light so as to create an ideal heterodyne detection state, when the local oscillator light power is high (about 10 dBm or more). The latter area is a theoretical margin in the heterodyne detection. The margin is a called a state of shot-noise limit.

As described above, when the local oscillator light power PLo is not high, the SNR or optical receiver sensitivity of the conventional coherent optical receiver is restricted not by the shot noise due to the local oscillator light power but mainly by the circuit noise of the electric amplifier so as not to be high. This is a problem. The local oscillator light power PLo needs to be high if the state of shot-noise limit is to be achieved. In other words, the local oscillator light power PLo needs to be about 10 dBm or more if the state of shot-noise limit is to be achieved, as mentioned above. The local oscillator light source 1 is made of a semiconductor laser-diode with which it is difficult to make the local oscillator light power PLo as high as about 10 dBm or more in present technology. If the local oscillator light power PLo were made capable of being rendered as high as about 10 dBm or more, the reliability of the local oscillator light source 1 could deteriorate. Therefore, it is not easy to set the local oscillator light power at such a high level. Although the state of shot-noise limit can be achieved by reducing the circuit noise of the electrical amplifier 5, the input impedance of the amplifier or the load resistance of the optical detector needs to be decreased if signals in a wideband are to be transmitted. However, as understood from the equation, if the load resistance is reduced, the circuit noise increases to lower the SNR or become uneasy to be decreased.

"Balanced dual-detector receiver for optical heterodyne communication at Gbit/s rates, ELECTRONICS LETTERS, 10th Apr. 1988, Vol. 22, No. 8" and "Local-oscillator excess-noise suppression for homodyne and heterodyne detection, OPTICS LETTERS, August 1983 Vol. 8, No 5" show the above-mentioned prior art.

SUMMARY OF THE INVENTION

Accordingly, it is object of the present invention to provide a coherent optical receiver, which is effective and appropriate to solve the above-mentioned problem. This is accomplished by making the optical receiver sensitivity close to the state of shot noise-limit.

The present invention has the feature that the optical coherent receiver comprises a local oscillator light source for providing a local oscillator light, an optical amplifier for amplifying said local oscillator light, a light combining/dividing unit for combining a signal light and said amplified local oscillator light and dividing said combined light for two, a dual balanced receiver which comprises two optical detectors for converting said two divided lights into electrical signals and for synthesizing said two electrical signals, and an electrical amplifier for amplifying said synthetic electrical signal, wherein said light combining/dividing unit and said dual balanced receiver further comprises two signal passages for connecting between a combine point of said unit and a synthetic point of said dual balanced receiver.

DETAILED DESCRIPTION OF PREFERRED EMBODIMENTS

First Embodiment

An embodiment of the present invention is hereafter described in detail with reference to the drawings attached hereto.

The first embodiment of the present invention is hereafter described with reference to FIGS. 1 and 4. The embodiment is a coherent optical receiver β. The same reference symbols in FIGS. 1 and 5 denote equivalents. The receiver β comprises an optical amplifier 6, and the same components as the conventional optical receiver α. The optical amplifier 6 amplifies the power of a local oscillator light Lo to a sufficiently high level. Although the amplifier 6 is an erbium-doped optical fiber amplifier, it may be a semiconductor laser amplifier, a fiber Raman amplifier, a fiber Brillouin amplifier or the like. Although the light combining/dividing unit 2 of the receiver β is a beam splitter, the unit may be an optical fiber coupler, an optical waveguide or the like. The lengths of two signal passages including the point at which a signal light S and the local oscillator light Lo' amplified by the optical amplifier 6 are combined and divided in the light combining/dividing unit 2, two optical paths extending from the point to the two optical detectors 3 and 4 of the device, electric paths through which electrical signals converted from the signal light and the amplified local oscillator light by the optical detectors are transmitted, and the point at which the electrical signals are synthesized with each other, are preset so that the times which it takes for the lights and the electrical signals to be transmitted through the two signal passages are equal to each other in length. The branching ratio of the light combining/dividing unit 2, the transmission losses in the two signal passages, and so forth are preset so that the intensities of the signals at the point of the synthesis are equal to each other.

The operation of the coherent optical receiver β is described in detail from now on. The local oscillator light Lo emitted from the local oscillator light source 1 of the device is amplified to sufficient power by the optical amplifier 6. The amplified local oscillator light Lo' and the signal light S are combined and divided by the light combining/dividing unit 2, the two outputs from which are transmitted to the two optical detectors 3 and 4 constituting a differential circuit. The times which it takes for the signals to be transmitted through the two signal passages extending from the point of the combination and division of the signals in the unit 2 to the point of the synthesis of the signals are preset to be equal to each other in length. The intensities of the signals at the point of the synthesis thereof in the two signal passages are also preset to be equal to each other. For these reasons, signal currents equal to each other in amplitude but inverse to each other in phase flow in the optical detectors 3 and 4. An output signal O resulting from the synthesis of the outputs from the optical detectors 3 and 4 is a signal current whose amplitude is two times as large as that of each of the former signal currents. If the amplification gain of the optical amplifier 6 is heightened, the power PLo of the amplified local oscillator light is augmented to increase a detected signal component, as shown in FIG. 6.

A spontaneous emission noise which is naturally emitted from the optical amplifier 6 is an important consideration for the present invention, and is described from now on. When the amplification gain of the amplifier 6 is heightened, the power of the local oscillator light Lo is sufficiently amplified but the noise is increased to have excessively high power. The noise is transmitted to the optical detectors 3 and 4 through the light combining/dividing unit 2 so that each of the detection outputs from the receivers would include a shot noise due to the spontaneous emission noise, a beat noise due to the signal light and the spontaneous emission noise, a beat noise due to the local oscillator light and the spontaneous emission noise, and a beat noise due to the spontaneous emission noises. The beat noise due to the local oscillator light and the spontaneous emission noise is very large in magnitude, because the power of the local oscillator light is amplified to be high. If the coherent optical receiver β included only one optical detector, the optical receiver sensitivity of the device would be lower because of the beat noise due to the local oscillator light and the spontaneous emission noise with the amplification of the local oscillator light by the optical amplifier 6 than without the amplification. However, since the outputs from the optical detectors 3 and 4 are differentially synthesized with each other in the embodiment, the beat noises due to the spontaneous emission noises are almost all eliminated to make it possible to heighten the amplification gain of the optical amplifier 6 to achieve a state of shot-noise limit, as described in detail hereinafter. Since the times which it takes the signals to be transmitted through the two signal passages are preset to be equal to each other in length and the intensities of the signals at the point of the synthesis thereof in the passages are preset to be equal to each other, noise currents which are based on the beat noises due to the signal light S and the spontaneous emission noise and are equal to each other in amplitude but inverse to each other in phase, noise currents which are based on the beat noises due to the local oscillator light Lo and the spontaneous emission noise and are equal to each other in amplitude and phase, and noise currents which are based on the beat noises due to the spontaneous emission noises and are equal to each other in amplitude and phase, flow in the optical detectors 3 and 4. Since the outputs from the light receivers are differentially synthesized with each other, the noise currents which are based on the beat noises due to the signal light S and the spontaneous emission noise and are equal to each other in amplitude but inverse to each other in phase act so that an output based on the noise currents and having an amplitude equal to the sum of the amplitudes of the noise currents is sent to the first-stage electrical amplifier 5 of the device. Meanwhile, the noise currents which are based on the beat noises due to the local oscillator light Lo and the naturally emitted light noise and are equal to each other in amplitude and phase offset each other, and the noise currents which are based on the spontaneous emission noises and are equal to each other in amplitude and phase also offset each other, because of the differential circuit of the optical detectors 3 and 4, so that the noise currents are eliminated. Since the shot noises due to the spontaneous emission noises have no correlation to each other in the optical detectors 3 and 4, the shot noises are added to each other in the differential circuit so that the sum of the shot noises appears in the output from the circuit. However, the sum is weak and negligible. As a result, the amplification gain of the optical amplifier 6 can be heightened to augment the power of the local oscillator light to achieve the state of shot-noise limit.

Figure 4:
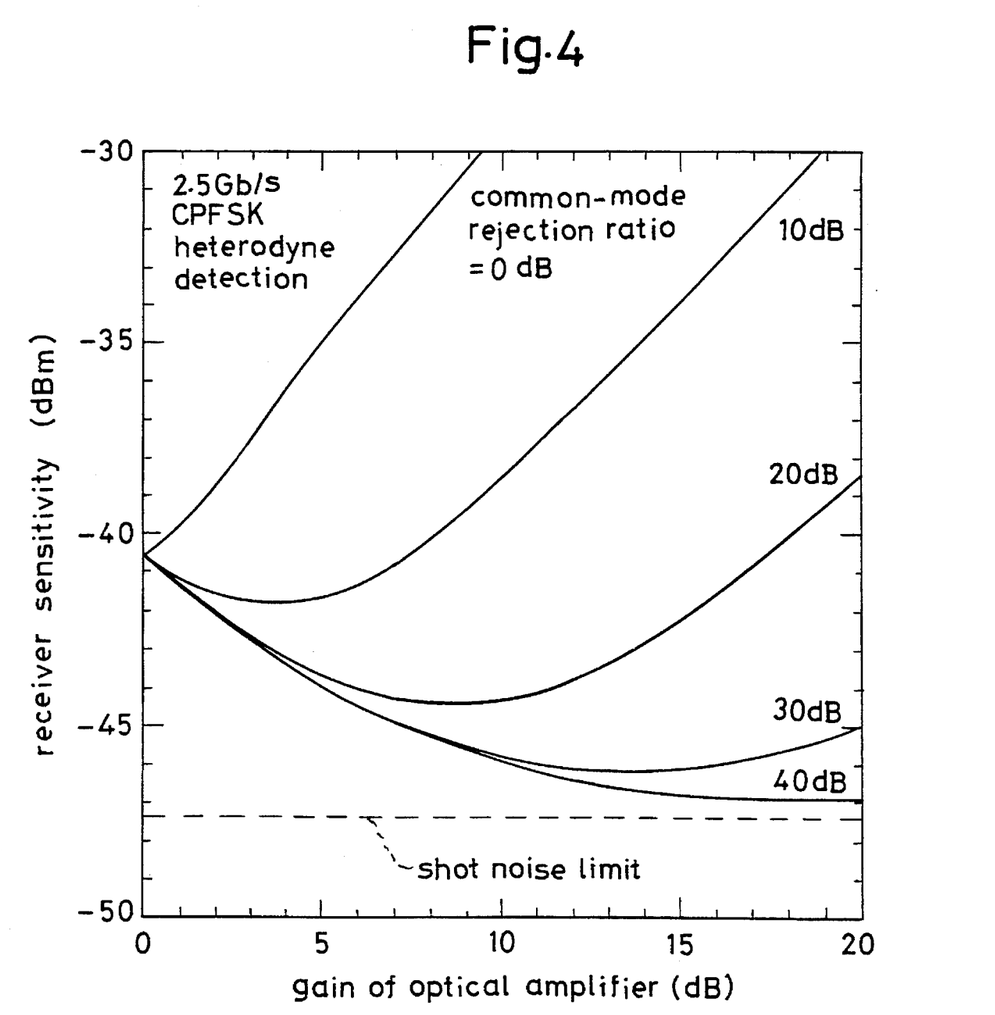
FIG. 4 is a graph showing the correlation between the optical receiver sensitivity of the receiver shown in FIG. 1, and the amplification gain of the optical amplifier of the device.

To describe the effectiveness of the coherent optical receiver device β, FIG. 4 shows the results of actual examples of calculation of the dependency of the optical receiver sensitivity of the device on the light amplification gain of the optical amplifier 6 in 2.5 -Gbit/sec. CPFSK heterodyne detection. For the calculation, a degree which is herein called a common-mode rejection ratio and indicates whether the times which it takes for the signals to be transmitted through the signal passages are preset to be equal to each other in length and the intensities of the signals at the point of the synthesis thereof in the passages are preset to be equal to each other is used as a parameter. When the common-mode rejection ratio is high, it means that the times are preset to be equal to each other in length and the intensities are also preset to be equal to each other. In the calculation, the load resistance to the output resulting from the synthesis of the outputs from the optical detectors 3 and 4 is set at 50Ω and the electric power of the local oscillator light Lo emitted from the local oscillator light source 1 is set at 1 mW (0dBm). If the optical amplifier 6 for amplifying the local oscillator light Lo were not used or the amplification gain was zero, the coherent optical receiver β would operate with a state of circuit-noise limit, not with the state of shot-noise limit which should be achieved with the device. When the common-mode rejection ratio is 0 dB, the beat noise due to the local oscillator light Lo and the spontaneous emission noise is not suppressed, so that the optical receiver sensitivity of the device falls as the amplification gain of the optical amplifier 6 is heightened. However, it is understood from FIG. 4 that when the common-mode rejection ratio is increased, the device produces an effect to enhance the optical receiver sensitivity. Particularly when the common-mode rejection ratio is about 40 dB or more, the optical receiver sensitivity of the device is made close to the state of shot-noise limit. To set the common-mode rejection ratio at 40 dB or more, the difference between the times which it takes for the signals to be transmitted through the signal passages, and that between the intensities of the signals at the point of the synthesis in the passages need to be about 1 psec. or less (about 0.2 mm or less in terms of optical fiber length, and about 0.1 dB or less, respectively).

The coherent optical receiver β can be used not only for optical communication or measurement, but also for a polarization diversity system for compensating polarization.

Second Embodiment

The second embodiment of the present invention is hereafter described with reference to FIG. 2. It is the feature that the times which it takes for the signals to be transmitted through the signal passages extending from the light combining/dividing unit 2 to the point of the synthesis of the outputs from the optical detectors 3 and 4 are preset to be equal to each other in length, and the intensities of the signals at the point in the passages are preset to be equal to each other. The second embodiment is a coherent optical receiver γ for better and more efficiently fulfilling the features. The same reference symbols in FIGS. 1 and 2 denote equivalents. The receiver γ comprises an optical phase adjuster 7 such as an optical phase modulator, an optical phase adjuster 8 such as an optical phase modulator, an optical attenuator 9 such as an electro absorption-type modulator, an optical attenuator 10 such as an electro absorption-type modulator, and the same components as the preceding device β. The optical phase adjuster 7 is for controlling the time which it takes for a signal to be transmitted through a signal passage extending from the light combining/dividing unit 2 to the point of the synthesis of the outputs from the optical detectors 3 and 4 through the former optical detector 3. The other optical phase adjuster 8 is for controlling the time which it takes for a signal to be transmitted through a signal passage extending from the light combining/dividing unit 2 to the point of the synthesis of the outputs from the optical detectors 3 and 4 through the latter optical detector 4. The optical attenuator 9 is for controlling the intensity of the signal which is transmitted in the signal passage extending from the unit 2 to the point of the synthesis through the former optical detector 3. The other optical attenuator 10 is for controlling the intensity of the signal which is transmitted in the signal passage extending from the unit 2 to the point of the synthesis through the latter optical detector 4. Also, the branching of the ratio of the light combining/dividing unit 2 can be changed for controlling the intensity of the signal when the unit 2 includes a fine branching control function.

The operation of the device γ is described in detail from now on. For the purpose of improving the common-mode rejection ratio of the device, the times which it takes for the signals to be transmitted through the signal passages including the point of the combination and division of a signal light S and an amplified local oscillator light Lo' in the light combining/dividing unit 2, two optical paths for the optical outputs from the unit, two electric paths for the electric outputs from the optical detectors 3 and 4, and the point of the synthesis of the electric outputs are preset to be equal to each other in length, and the intensities of the signals at the point of the synthesis in the passages are preset to be equal to each other. For that purpose, the optical phase adjusters 7 and 8 are used to control the times which it takes for the signals to be transmitted through the signal passages, and the optical attenuators 9 and 10 are used to control the intensities of the signals at the point of the synthesis in the passages.

Figure 1:
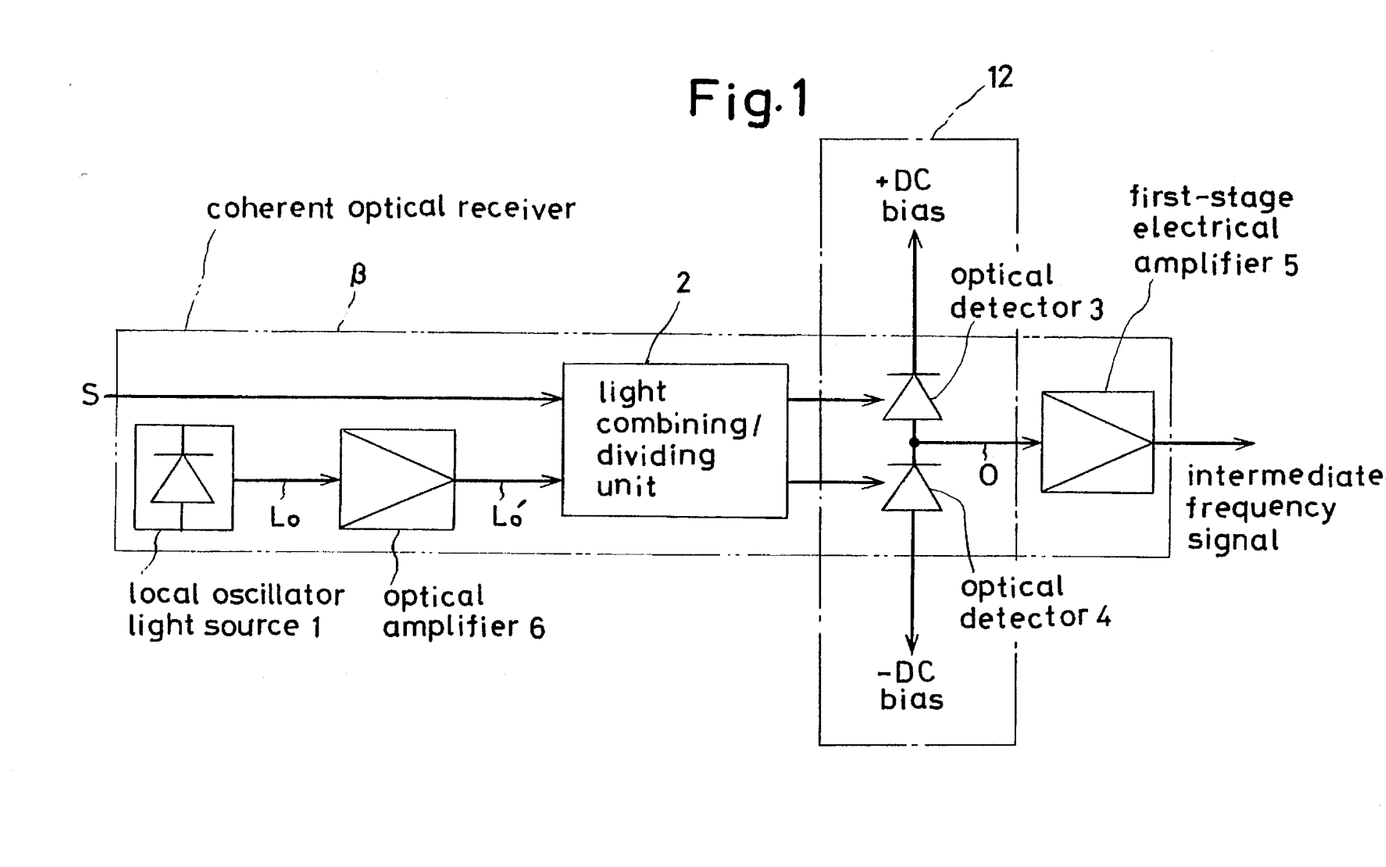
FIG. 1 is a block diagram of a coherent optical receiver which is the first embodiment of the present invention.
Figure 2:
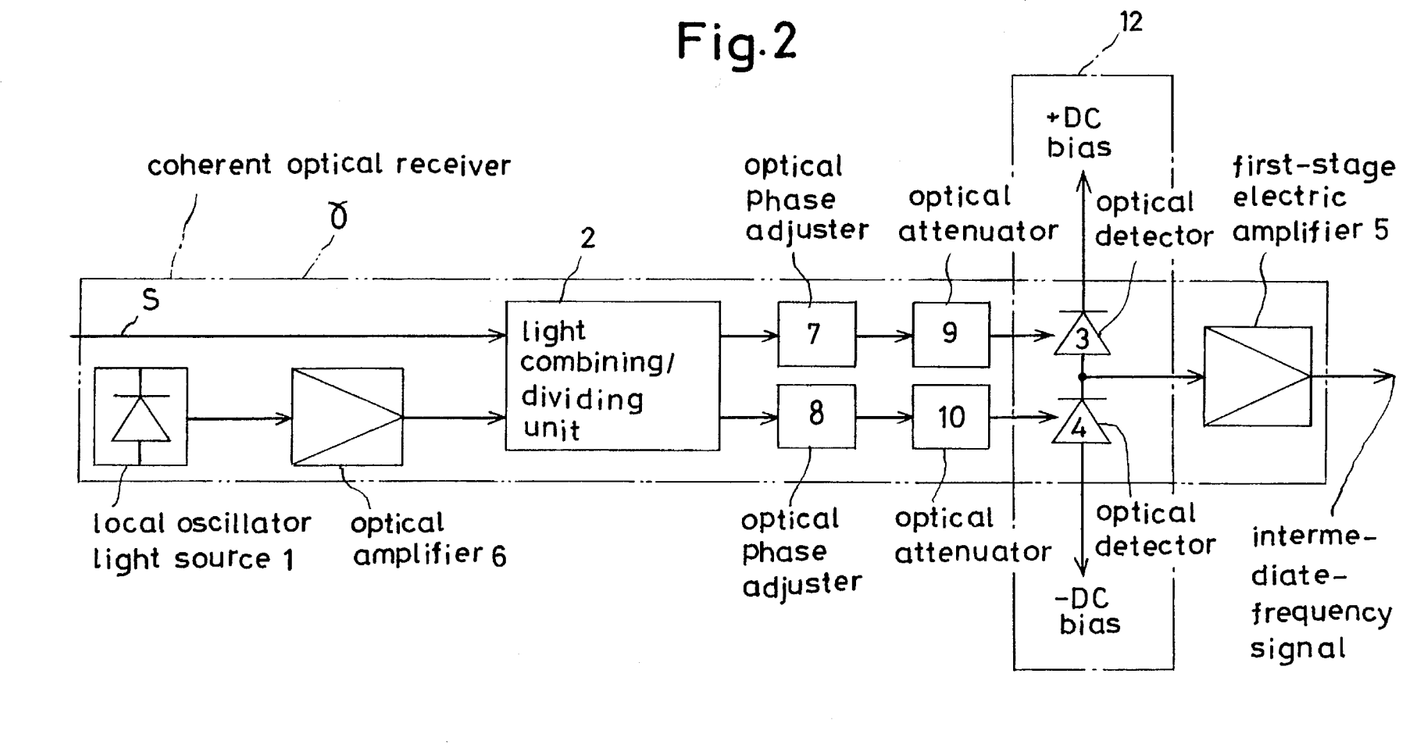
FIG. 2 is a block diagram of a coherent optical receiver which is the second embodiment of the present invention.
Figure 3:
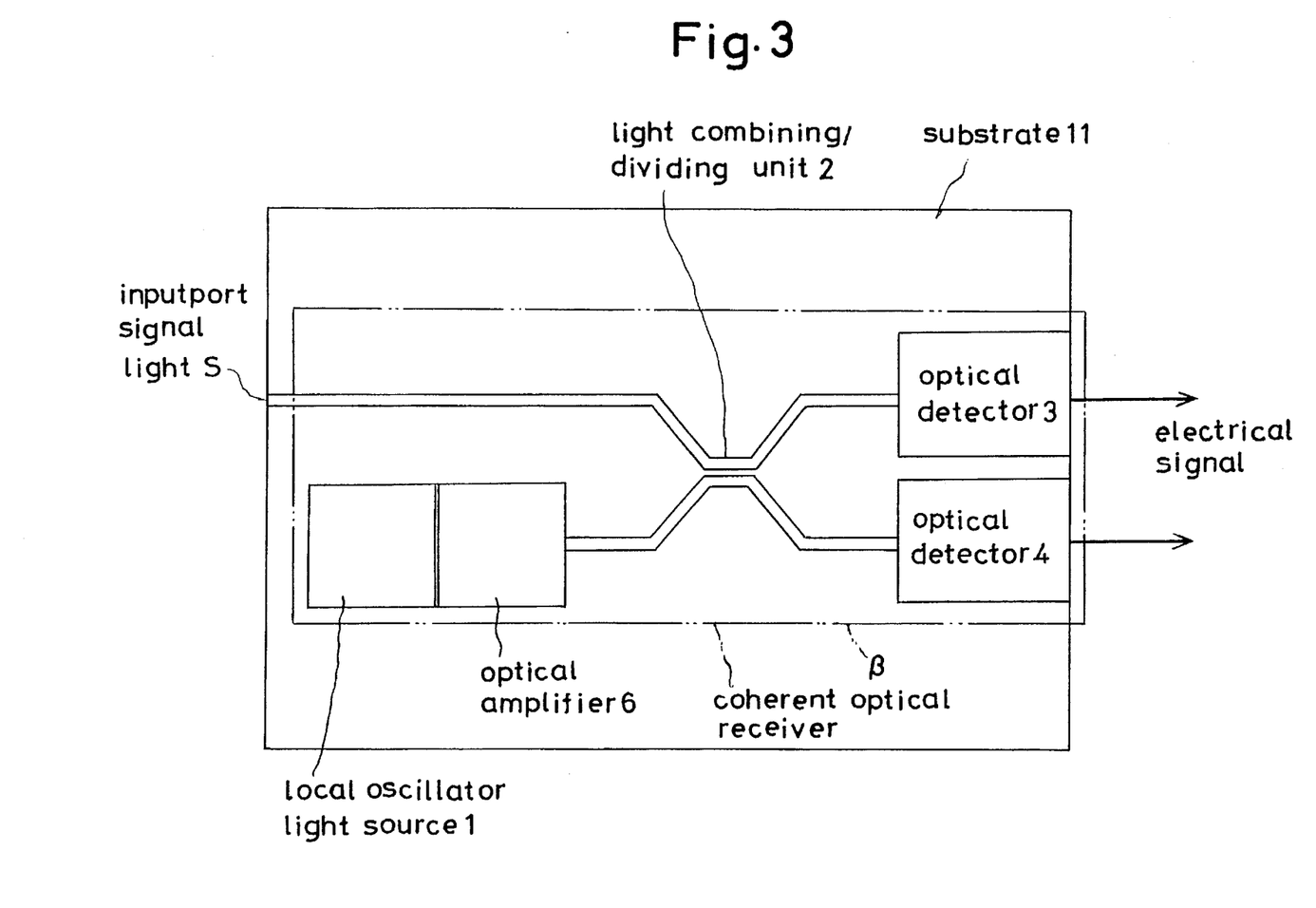
FIG. 3 is a block diagram of an integration of components of the receiver shown in FIG. 1.

Desired ones of the components of the coherent optical receiver β shown in FIG. 1 may be integrated together on a substrate 11, as shown in FIG. 3, to reduce the errors in the times of the transmission of the signals through the passages and those in the intensities of the signals at the point of the synthesis in order to produce a higher effect.

The optical receiver sensitivity of a coherent optical receiver provided in accordance with the present invention can be easily much heightened. For that reason, the device has the characteristic that the length of the non-repeating section of an optical communication system including the device and employing heterodyne detection can be increased, or the dynamic range of an optical measuring system including the device and employing heterodyne detection can be widened. A very high effect can be thus be produced by the device.

What is claimed is:

1. A coherent optical receiver for coherent light detection, said receiver comprising:

local oscillator light source means for providing a local oscillator light, optical amplifier means for amplifying only said local oscillator light, light combining/dividing unit means for combining a non-amplified a signal light and said amplified local oscillator light and dividing said combined light into two divided lights, a dual balanced receiver comprising two optical detector means for converting said two divided lights into electrical signals and for synthesizing said two electrical signals, and electrical amplifier means for amplifying said synthesized electrical signal, wherein said light combining/dividing unit means and said dual balanced receiver further comprise two signal passage means for connecting between a common point of said combining/dividing unit means and a synthesis point of said dual balanced receiver.

2. The coherent optical receiver according to claim 1, wherein said two signal passage means have equal signal propagation times.

3. The coherent optical receiver according to claim 1, further comprising;

propagation time control means for controlling the signal propagation times of said two signal passage means to be equal to each other.

4. The coherent optical receiver according to claim 3, wherein said propagation time control means comprises an optical phase adjuster.

5. The coherent optical receiver according to claim 1, wherein said electrical signals of said two signal passage means have equal intensities to each other at said synthesis point.

6. The coherent optical receiver according to claim 1, further comprising;

optical attenuator means for controlling the intensity of said two divided lights to equalize the intensities of said electrical signals to each other at said synthesis point.

7. The coherent optical receiver according to claim 1, wherein said light combining/dividing unit means further comprises fine branching control function means for controlling the intensities of said two divided lights to equalize the intensity of said electrical signals to each other at said synthesis point.

8. The coherent optical receiver according to claim 1, wherein said light combining/dividing unit means comprises an element selected from the group consisting of a beam splitter, an optical fiber coupler and an optical waveguide.

9. The coherent optical receiver according to claim 1, wherein said optical amplifier means comprises an amplifier selected from the group consisting of an optical fiber amplifier made of an erbium-doped optical fiber, a semiconductor laser amplifier, a fiber Raman amplifier, and a fiber Brillouin amplifier.

10. The coherent optical receiver according to claim 1, wherein said coherent optical receiver is an integrated receiver.

11. The coherent optical receiver according to claim 1, wherein said two signal passage means have equal signal propagation times to each other and equal intensities of said two electrical signals to each other at said synthesis point.

12. A coherent optical receiver for coherent light detection, said receiver comprising:

local oscillator light source means for providing a local oscillator light, optical amplifier means for amplifying only said local oscillator light, light combining/dividing unit means for combining a non-amplified signal light and said amplified local oscillator light and dividing said combined light into two divided lights, a dual balanced receiver comprising optical detector means for converting said two divided lights into electrical signals and for synthesizing said two electrical signals, electrical amplifier means for amplifying said synthesized electrical signal, wherein said light combining/dividing unit means and said dual balanced receiver further comprise two signal passage means for connecting between a common point of said combining/dividing unit means and a synthesis point of said dual balanced receiver, propagation time control means for controlling the signal propagation times of said two signal passage means to be equal to each other, and optical attenuator for controlling the intensity of said two divided lights to equalize the intensities of said electrical signals to each other at said synthesis point.

13. The coherent optical receiver according to claim 12, wherein said light combining/dividing unit means comprises an element selected from the group consisting of a beam splitter, an optical fiber coupler and an optical waveguide.

14. The coherent optical receiver according to claim 12, wherein said optical amplifier means comprises an amplifier selected from the group consisting of an optical fiber amplifier made of an erbium-doped optical fiber, a semiconductor laser amplifier, a fiber Raman amplifier, and a fiber Brillouin amplifier.

* * * * *